United States Patent
Lindoff et al.

(10) Patent No.: US 8,892,094 B2
(45) Date of Patent: Nov. 18, 2014

(54) CELL SEARCH AND MEASUREMENT IN HETEROGENEOUS NETWORKS

(75) Inventors: Bengt Lindoff, Bjärred (SE); Lars Lindbom, Karlstad (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 646 days.

(21) Appl. No.: 12/899,780

(22) Filed: Oct. 7, 2010

(65) Prior Publication Data

US 2011/0306340 A1 Dec. 15, 2011

Related U.S. Application Data

(60) Provisional application No. 61/354,900, filed on Jun. 15, 2010.

(51) Int. Cl.
| | |
|---|---|
| *H04W 4/00* | (2009.01) |
| *H04W 24/10* | (2009.01) |
| *H04W 88/08* | (2009.01) |
| *H04W 8/00* | (2009.01) |

(52) U.S. Cl.
CPC .............. *H04W 24/10* (2013.01); *H04W 88/08* (2013.01); *H04W 8/005* (2013.01)
USPC .......................................... 455/434; 370/338

(58) Field of Classification Search
CPC . H04W 36/0061; H04W 36/04; H04W 36/16; H04J 11/0069; H04J 11/0093; H04J 11/0083
USPC ........................................... 455/434; 370/338
See application file for complete search history.

(56) References Cited

U.S. PATENT DOCUMENTS

| | | | |
|---|---|---|---|
| 2009/0213766 A1* | 8/2009 | Chindapol et al. | 370/278 |
| 2009/0238114 A1 | 9/2009 | Deshpande et al. | |
| 2009/0264142 A1* | 10/2009 | Sankar et al. | 455/501 |
| 2009/0318144 A1* | 12/2009 | Thomas et al. | 455/434 |

FOREIGN PATENT DOCUMENTS

| | | | |
|---|---|---|---|
| WO | 2008086648 A1 | 7/2008 | |
| WO | 2009002252 A1 | 12/2008 | |

* cited by examiner

*Primary Examiner* — Marcos Batista
(74) *Attorney, Agent, or Firm* — Coats & Bennett, P.L.L.C.

(57) ABSTRACT

An extended cell search procedure enables more inclusive measurement reports by mobile terminals operating in a heterogeneous network. The mobile terminal may be configured to conduct an extended cell search to enable better detection of signals transmitted from weaker cells. For mobile terminal with extended cell search capabilities, the network sends an extended cell search message to the mobile terminal when there is a need for an extended cell search. In response to the extended cell search message, the mobile terminal uses an extended cell search procedure rather than the normal cell search procedure (as specified in Rel-8 of the LTE standard) when performing cell searches.

36 Claims, 6 Drawing Sheets

CELL SEARCH AND MEASUREMENT IN HETEROGENEOUS NETWORKS

RELATED APPLICATION

This application claims the benefit of U.S. Provisional Patent Application 61/354,900, filed Jun. 15, 2010, titled "Cell Search and Measurements in Heterogeneous Network," which is incorporated herein by reference.

TECHNICAL FIELD

The present invention relates generally to heterogeneous networks comprising a mixture of low power and high power nodes with overlapping coverage and, more particularly, to cell searching and measurement in a heterogeneous network.

BACKGROUND

The new Third Generation Partnership Project (3GPP) standard known as Long Term Evolution (LTE) (3GPP LTE Rel-10) supports heterogeneous networks. In heterogeneous networks, a mixture of cells of different size and overlapping coverage areas are deployed. For example, a heterogeneous network may deploy pico cells served by relatively low power nodes within the coverage area of a macro cell served by relatively high power base stations. Heterogeneous networks could also deploy relatively low-power home base stations and relays to provide improved service in indoor areas. The aim of deploying low power nodes, such as pico base stations, home base stations, and relays, within a macro cell where coverage is provided by a high power base station, is to improve system capacity by means of cell splitting gains as well as to provide users with wide area experience of very high speed data access throughout the network. Heterogeneous deployment schemes represent one alternative to deployment of denser networks of macro cells and are particularly effective to cover traffic hotspots, i.e. small geographical areas with high user densities served by lower power nodes.

In heterogeneous networks, there may be a large disparity in output power of the low power nodes compared to the base stations serving macro cells. For example, the output power of the base stations in the macro cells may be in the order of 46 dBm while the output power of the low power nodes in the pico cells may be less than 30 dBm. In Release 8 and 9 of the LTE standard, a mobile terminal is required to find and perform signal measurements for cells with a Es/Iot ratio greater than or equal to −6 dB. Thus, there is no requirement that the mobile terminal finds and reports pico cells in some heterogeneous deployment scenarios. Further, the large difference in output power of the macro cells compared to the pico cells may make measurements of signals transmitted by the pico cells difficult.

Therefore there is a need for a method and apparatus enabling mobile terminals operating in heterogeneous networks detect and measure signal transmitted by pico cells that could be up to 10-15 dB below the signals transmitted by overlapping macro cell base stations.

SUMMARY

An extended cell search procedure is described to enable more inclusive measurement reports by mobile terminals in a heterogeneous network. The mobile terminal may be configured to conduct an extended cell search to enable better detection of signals transmitted from weaker cells. For mobile terminal with extended cell search capabilities, the network sends an extended cell search message to the mobile terminal when there is a need for an extended cell search. The need for an extended cell search may arise, for example, when the mobile terminal is operating in or near an area served by both pico cells and macro cells. When pico cells or other low power access nodes are present in the general vicinity of the mobile terminal, the network can instruct the mobile terminal to use an extended cell search procedure. In response to the extended cell search message, the mobile terminal uses an extended cell search procedure rather than the normal cell search procedure (as specified in Rel-8 of the LTE standard) when performing cell searches.

Accordingly, exemplary embodiments of the present invention comprise extended cell search procedures implemented by a base station in a heterogeneous network. The base station determines whether a mobile terminal served by the base station has extended cell search capability. If so, the base station sends an extended cell search message to the mobile terminal to enable extended cell searching by the mobile terminal. The base station may also send a transmitting a measurement map to the mobile terminal relating cell identities of candidate cells and corresponding subframes for performing measurements.

Other embodiments of the invention comprise a base station configured to support extended cell searches. In one exemplary embodiment, the base station comprises a transceiver for communicating with mobile terminals and a control circuit to control operation of the transceiver. The control circuit is configured to determine whether a mobile terminal served by the base station has extend cell search capability and to send an extended sell search message to the mobile terminal when an extended cell search is needed. The control circuit may be further configured to send a measurement map to the mobile terminal relating cell identities of candidate cells and corresponding subframes for performing measurements.

Other exemplary embodiments of the present invention comprise extended cell search procedure implemented by a mobile terminal in a heterogeneous network. In one exemplary embodiment, the mobile terminal receives an extended cell search message and a measurement map relating cell identities of candidate cells and corresponding subframes for performing measurements. The mobile terminal, in response to the extended cell search message begins performing extended cell searches based on the received measurement map.

DETAILED DESCRIPTION

Figure 1:
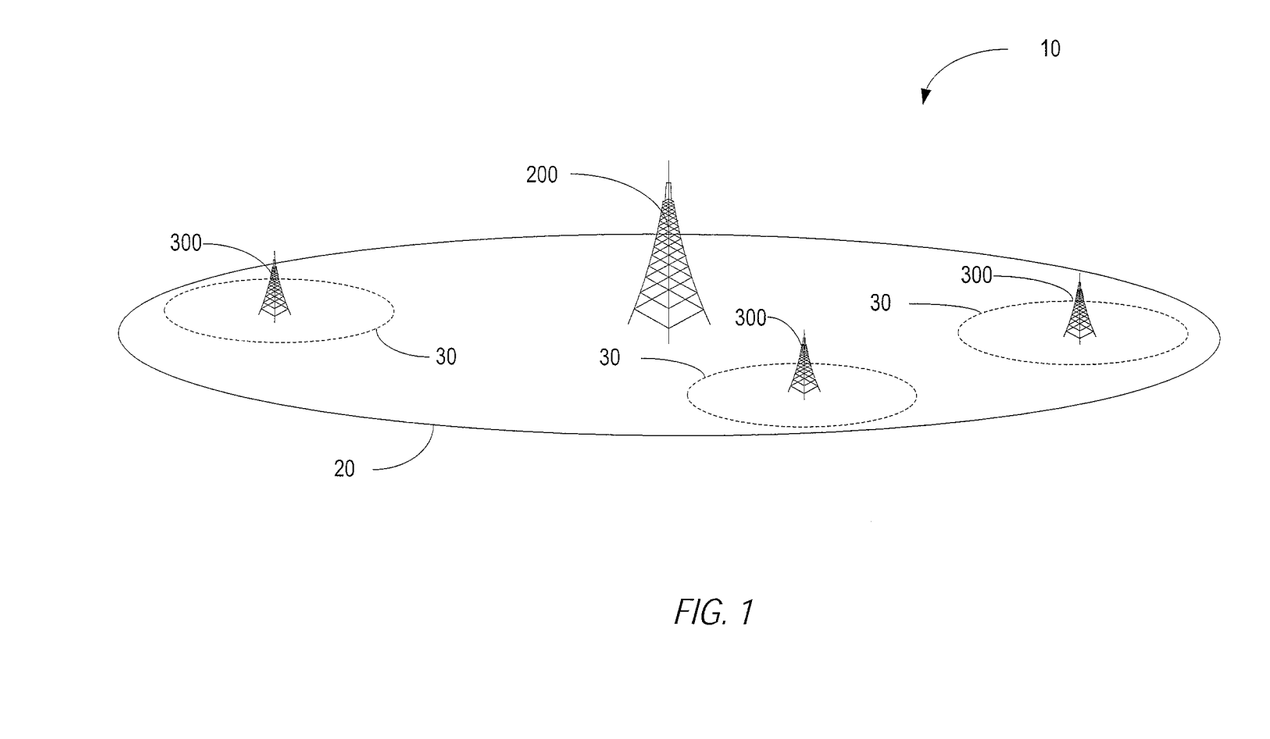
FIG. 1 is a schematic diagram of a heterogeneous communication network according to the present invention.

Turning now to the drawings, FIG. 1 illustrates an exemplary heterogeneous communication network 10 according to one exemplary embodiment of the present invention. The present invention is described in the context of a Long-Term Evolution (LTE) network, which is specified in Release 10 of the LTE standard. However, those skilled in the art will appreciate that the invention may be applied in heterogeneous networks using other communication standards.

The communication network 10 comprises a plurality of macro base stations or other high power access nodes 200 providing radio coverage in respective macro cells 20 of the communication network 10. In the exemplary embodiment shown in FIG. 1, three pico cells 30 served by low power access nodes 300 are deployed within the macro cell 20. The low power access nodes may comprise pico base stations or home base stations. The output power of the high power access nodes is presumed to be in the order of 46 dBm, while the output power of the low power access nodes is presumed to be less than 30 dBm.

In some heterogeneous networks 10, frequency separation between the different layers, i.e. macro and pico cells 20, 30 in FIG. 1, is used to avoid interference between the high power and low power access nodes 200 and 300 respectively. When frequency separation is used, the high power access nodes 200 and low power access nodes 300 operate on different non-overlapping carrier frequencies to reduce interference between the macro and pico layers. Cell splitting gains are obtained when the radio resources in the pico cell 30 can be simultaneously used when the macro cell 20 is transmitting. The is that drawback of frequency separation may lead to resource-utilization inefficiency. For example, when the pico cell 30 is lightly loaded so that its resources are not fully utilized, it may be more efficient to assign all carrier frequencies to the macro cell 20. However, the split of carrier frequencies between layers is typically static.

In some heterogeneous networks 10, radio resources on same carrier frequencies are shared by the macro and pico layers by coordinating transmissions in the overlapping macro and pico cells 20, 30. This type of coordination is referred to as inter-cell interference coordination (ICIC). Certain radio resources are allocated for the macro cells 20 during some time period whereas the remaining resources can be accessed by pico cells 30 without interference from the macro cell 20. Depending on the load distribution across the layers, the resource split can change over time to accommodate different load distributions. In contrast to the splitting of carrier frequencies, sharing radio resources across layers using some form of ICIC can be made more or less dynamic depending on the implementation of the interface between the access nodes. In LTE, an X2 interface has been specified in order to exchange different types of information between access nodes. One example of such information exchange is that a base station 200 can inform other base stations 200 that it will reduce its transmit power on certain resources.

In order to establish a connection with the LTE network 10, the mobile terminal 100 needs to find and acquire synchronization with a cell 20, 30 within the network 10, read system parameters from a broadcast channel in the selected cell 20, 30, and perform a random access procedure to establish a connection with the selected cell 20, 30. The first of these steps is commonly referred to as cell search. To assist the mobile terminal 100 in the cell search procedure, the base station 200 transmits two synchronization signals on the downlink; the Primary Synchronization Signal (PSS) and the Secondary Synchronization Signal (SSS). The synchronization signals transmitted in each cell 20, 30 comprise a specific set of sequences that define the cell identity. The LTE standard specifies the location in time and frequency of the synchronization signals. Thus, by detecting the synchronization signals, the mobile terminal 100 will acquire the timing of a candidate cell 20, 300, and, by observing which of multiple sequences the cell is transmitting, the mobile terminal 100 can identity of the cell 20, 30.

A mobile terminal 10Q does not carry out cell search only at power-up, i.e. when initially accessing the system. In order to support mobility, the mobile terminals 100 need to continuously search for, synchronize to, and estimate the reception quality of signals transmitted by neighbor cells. The mobile terminals 100 may evaluate the reception quality of signals from the neighbor cells, in comparison to the reception quality of the current serving cell, to determine whether a handover (for mobile terminals 100 in connected mode) or cell re-selection (for mobile terminals 100 in idle mode) should be carried out. For mobile terminals 100 in connected mode, the network 10 makes the handover decision based on measurement reports provided by the mobile terminals 100.

The measurement reports provided by the mobile terminal 100 may include measurements of the reference signal received power (RSRP) and/or reference signal received quality (RSRQ). Depending on how these measurements, possibly complemented by a configurable offset, are used, the mobile terminal 100 can be connected to the cell 20, 30 with the strongest received power, or the cell 20, 30 with the lowest path loss, or a combination of the two. These selection criteria (received power and path loss) do not necessarily result in the same selected cell 20, 300. Because the output power varies for different types of access nodes 200, 300, it is possible that, for a given mobile terminal 100, the access node 200, 300 with the highest RSRP and RSRQ measurements and the access node 200, 300 with the lowest path loss are different. This situation is referred to herein as link imbalance.

Figure 2:
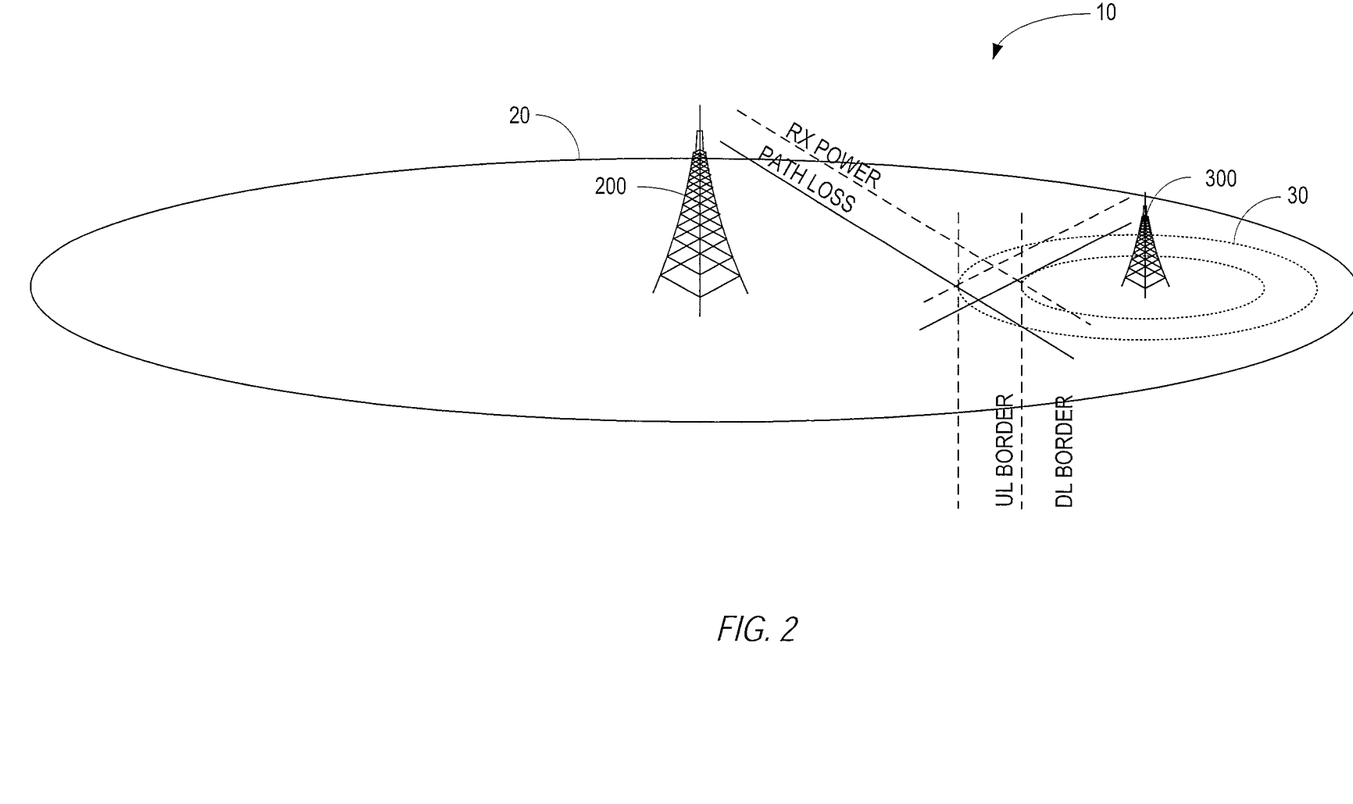
FIG. 2 illustrates a link imbalance scenario.
Figure 3:
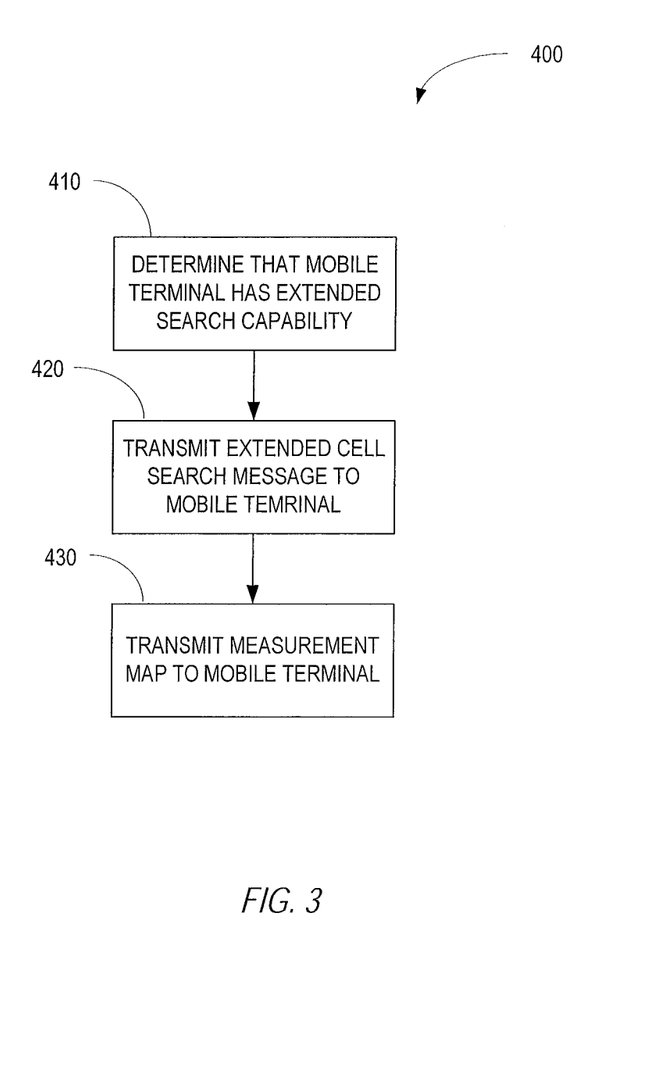
FIG. 3 illustrates an exemplary extended cell search procedure implemented by a base station or other network node.

FIG. 2 illustrates how link imbalance can occur in a heterogeneous network 10. It is realistically presumed for purposes of this example that the output power of a pico base station 300 in the pico cell 30 is in the order of 30 dBm or less, while the output power of the macro base station 200 is in the order of 46 dBm. Consequently, when the mobile terminal 100 is operating near the cell edge of the pico cell 30, the received signal strength from the macro cell 20 can be much larger than that of the pico cell 30. However, the path loss to the base station 200 in the macro cell 20 may be greater than the path loss to the pico base station 300 in the pico cell 30. In FIG. 3 the downlink border indicates the point at which the received signal strength from the macro cell 20 and pico cell 30 is equal. The uplink border indicates the point at which the path loss to the base stations 200, 300 in the macro cell 20 and pico cell 30 respectively are equal. The region between the DL and UL borders is the link imbalance zone. From a downlink perspective, it may be better for a mobile terminal 100 in the link imbalance zone to select a cell 20, 30 based on downlink received power, but from an uplink perspective, it may be better to select a cell 20, 30 based on the path loss because the transmit power of the mobile terminal 100 is limited. In this scenario, it might be preferable from a system perspective for the mobile terminal 100 to connect to the pico cell 30 even if the macro downlink is up to 10-20 dB stronger than the pico cell downlink. Therefore, the mobile terminal 100 needs to detect and measure signals from the pico cells 30 even when there is a large disparity in the RSRP and RSRQ measurements.

To enable more inclusive measurement reports, the mobile terminal 100 can be configured to conduct an extended cell search to enable better detection of signals transmitted from the pico cells 30. For mobile terminal 100 with extended cell search capabilities, the network 10 sends an extended cell search message to the mobile terminal 100 when there is a need for an extended cell search. The need for an extended cell search may arise, for example, when the mobile terminal 100 is operating in or near an area served by both pico cells 30 and macro cells 20. When pico cells 30 or other low power access nodes are present in the general vicinity of the mobile terminal 100, the network 10 can instruct the mobile terminal 100 to use an extended cell search procedure. In response to the extended cell search message, the mobile terminal 100 uses an extended cell search procedure rather than the normal cell search procedure (as specified in Rel-8 of the LTE standard) when performing cell searches. When the extended cell search procedure is invoked, the mobile terminal 100 performs and reports measurements for cells 20, 30 where the received signal strength is lower than specified for Rel-8 mobile terminals 100. Thus, when an extended cell search is performed, the mobile terminal 100 may use a lower threshold than currently specified for Rel-8 mobile terminals 100 for signal measurement and reporting purposes.

The mobile terminal 100 may extend the cell search to detect signals from the weaker cells 20, 30 in several ways. In some embodiments, the extended cell search may rely on the same Primary Sync Signal (PSS) and Secondary Sync Signal (SSS) for the standard cell search, but process the signals differently to improve search performance. For example, the mobile terminal 100 may use a longer (compared to Rel-8) averaging period to average the information contained in the PSS and/or SSS prior to the detection of the cell identity (cell ID). As another example, the mobile terminal 100 may use more receive antennas in the extended cell search along with some form of combining, such as maximal ratio combining (MRC). In other embodiments, the mobile terminal 100 can search for an expanded set of synchronization signals including the PSS, SSS, and other synchronization signals which may be specified for extended cell searches.

FIG. 3 illustrates an exemplary network procedure 400 implemented by a base station 200 in a serving macro cell 20. The base station 200 determines whether the mobile terminal 100 has extended cell search capability (block 410). Typically, this determination is made by at the time the mobile terminal 100 establishes a connection with the base station 200. To briefly summarize, the base stations 200 monitors the Random Access Channel (RACH) in order to detect mobile terminals 100 attempting to connect to the base station 200. Once a new mobile terminal 100 is detected, further signaling between the base station 200 and mobile terminal 100 may be carried out. For example, a mobile terminal 100 in idle mode may attempt to camp on the detected cell or may perform a location update procedure. An active mobile terminal 100 may send a connection request in order to establish a connection with the cell. In any event, during the signaling procedure, the mobile terminal category/capability may be sent to the base station 200. In some instances, the base station 200 may receive information about the mobile terminal capability from another base station 200 or other network node.

When there is a need for an extended cell search, the base station 200 sends an extended cell search message to the mobile terminal 100 (block 420). Whether an extended cell search is needed may depend on the deployment scenario and/or the location of the mobile terminal 100. In general, an extended cell search may be needed when the mobile terminal 100 is in or moving toward an area served by one or more pico cells 30.

The extended cell search message can be transmitted as a radio resource control (RRC) message. Alternatively, layer 1 signaling may be used to send the extended cell search message. The extended cell search message includes, at least, an indication that one or more pico cells 30 served by lower power nodes 300 are present in the vicinity of the mobile terminal 100 that could have signal-to-noise ratios (SNRs) below the reporting requirements of Release 8 LTE. The extended cell search message could also include a neighbor list containing the physical cell identities (PCIs) for the lower power access nodes 300 in the pico cells 30. In some embodiments, the base station may send a measurement map relating the PCIs to corresponding subframes for performing signal measurements. Thus, once a mobile terminal 100 has detected the PCI on the neighbor cell list, the mobile terminal 100 will have information about the subframes, frequencies, or similar information, where synchronization signals may be expected. The measurement map may be included in the cell search message, or may be included in a separate message.

Figure 4:
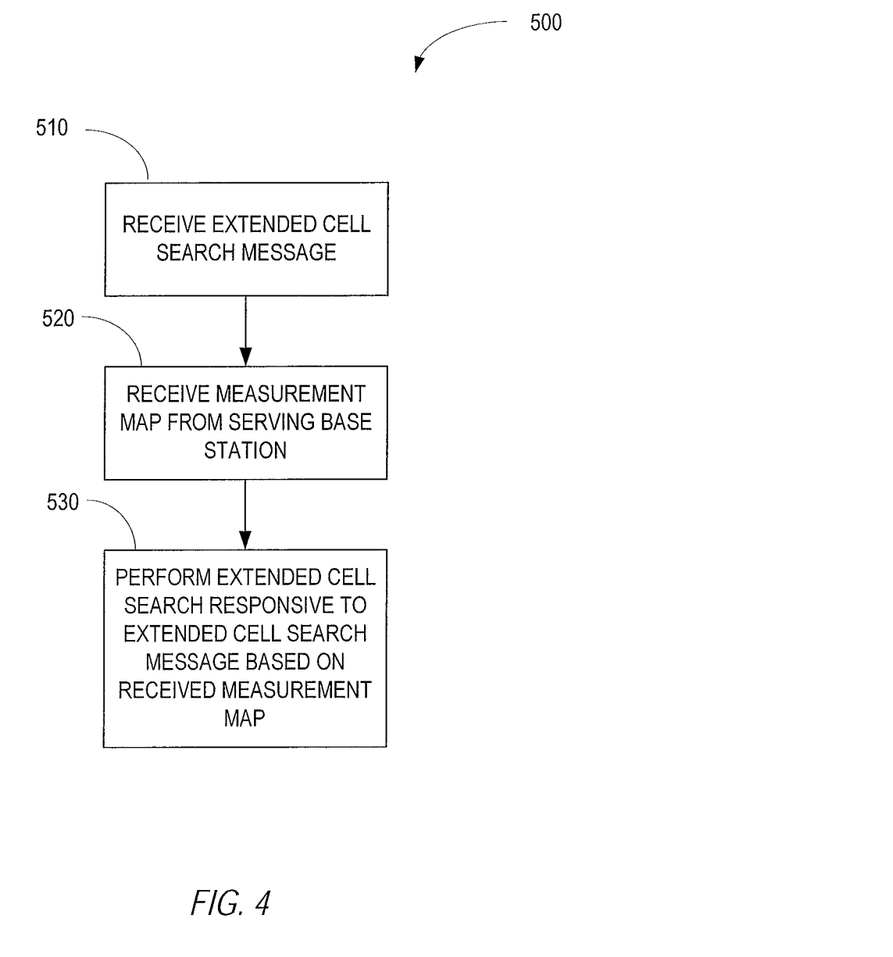
FIG. 4 illustrates an exemplary extended cell search procedure implemented by an active mobile terminal.

FIG. 4 illustrates an exemplary extended cell search procedure 500 for a mobile terminal 100. The extended cell search procedure is initiated when the mobile terminal 100 receives an extended cell search message from the serving base station 200 (block 510). As previously noted, the extended cell search message includes an indication that there are pico cells 30 in the vicinity of the mobile terminal 100 for which the received signal power may be lower than the minimum requirement for reporting as specified in Release 8 LTE. The extended cell search message could also include a neighbor list including the PCIs of cells 20, 30 to include in the extended cell search.

In some embodiments, the mobile terminal 100 also receives a measurement map from the serving base station 200 relating the PCIs of the cells 20, 30 in the neighbor cell list with corresponding subframes (block 520). In response to the extended cell search message, the mobile terminal 100 periodically performs an extended cell search based on the received measurement map (block 530). For example, the mobile terminal may start, on a regular basis, performing signal strength measurements (RSRP/RSRQ) for cells identified by each PCI on the corresponding subframes indicated by the measurement map. As previously noted, the mobile terminal 100 may search for an expanded set of synchronization signals when performing the extended cell search. The type, time, and frequency positions of the synchronization signals may be specified by standard, or may be communicated to the mobile terminal 100 in the extended cell search message, or other control signaling. The type, time, and frequency of the additional synchronization signals could also be specified in the measurement map transmitted by the base station 200. In performing the extended cell search, the mobile terminal 100 may employ longer averaging times or a larger number of antennas to increase likelihood of detection of the synchronization signals.

Figure 5:
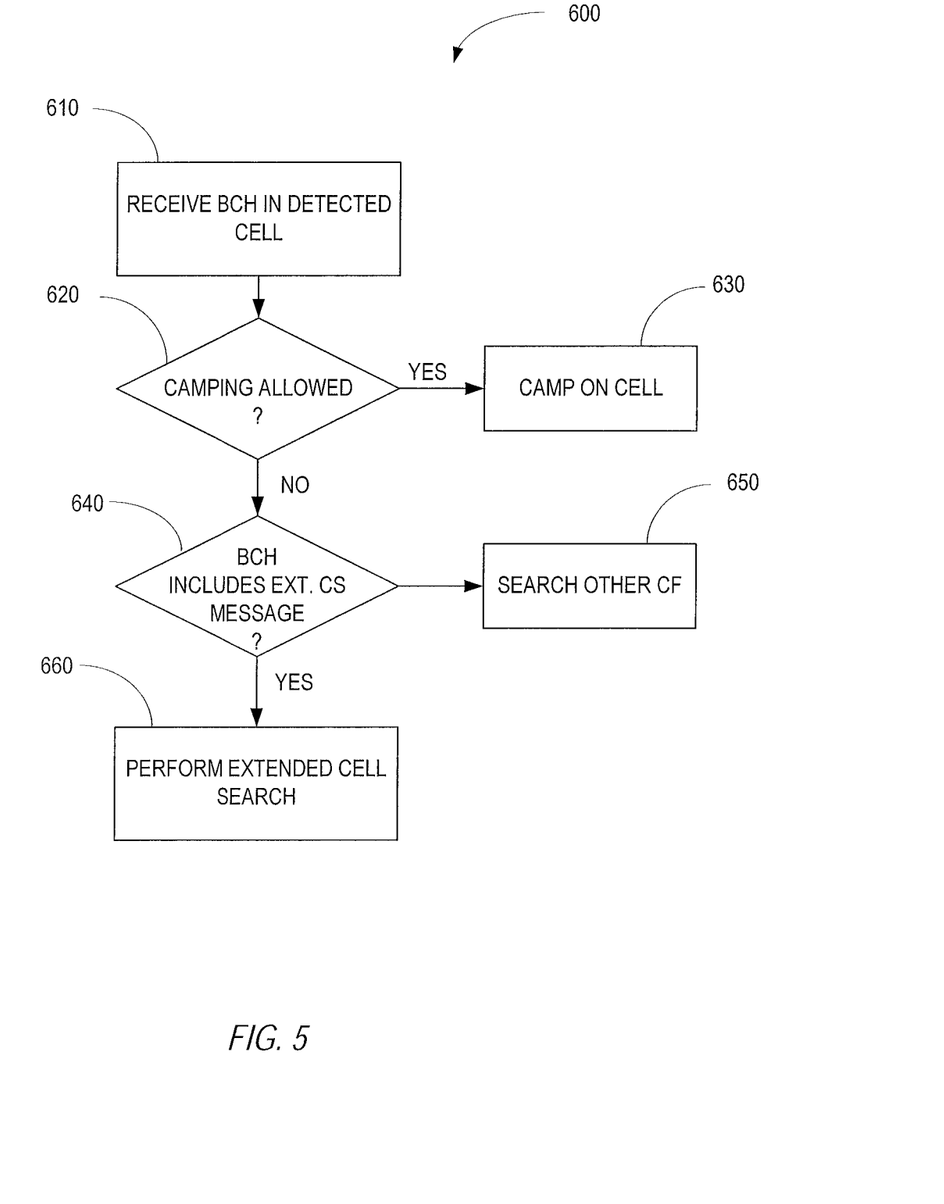
FIG. 5 illustrates an exemplary extended cell search procedure implemented by a mobile terminal during power-up.

FIG. 5 illustrates an alternative extended cell search procedure 600 for a mobile terminal 100. In this embodiment, the extended cell search message is transmitted by the base station 200 on a broadcast channel. The extended cell search message may be included in a master information block (MIB) or secondary information block (SIB). When a mobile terminal 100 with extended cell search capability is powered on, the mobile terminal searches for, and reads, the broadcast channel of a detected cell 20, 30 in the vicinity of the mobile terminal 100 (block 610). Based on information transmitted on the broadcast channel, the mobile terminal 100 determines whether camping is allowed (block 620). If so, the mobile terminal begins camping on the detected cell according to conventional camping procedures (block 630). If camping is not allowed, the mobile terminal 100 detects whether an extended cell search message was broadcast (block 640). Camping may be disallowed, for example, if the detected cell 20, 30 belongs to a different service provider, or may be disallowed based on user preferences. If the broadcast channel does not include an extended cell search message, the mobile terminal 100 continues searching for other cells (block 650). If the broadcast channel includes an extended cell search message, the mobile terminal 100 performs an extended cell search as previously described to search for weaker cells (block 660).

Figure 6:
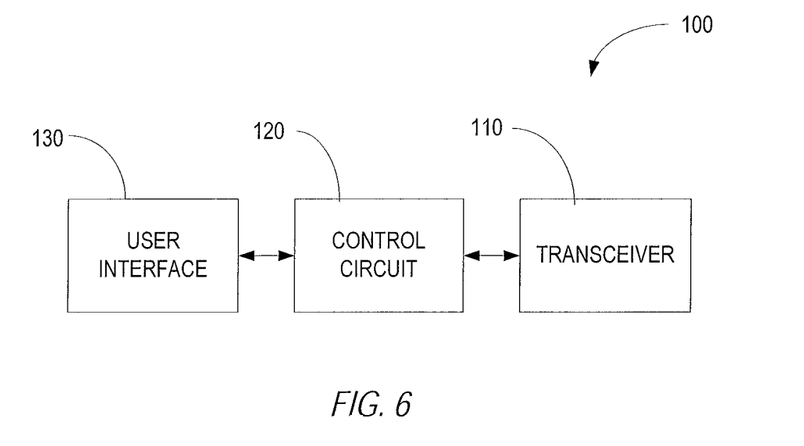
FIG. 6 illustrates an exemplary mobile terminal with extended cell search capability.

FIG. 6 illustrates an exemplary mobile terminal 100 that implements the extended cell search procedure described herein. The mobile terminal 100 comprises a transceiver 110, control circuit 120, and user interface 130. The transceiver 110 comprises a standard cellular transceiver according to the LTE standard, or other standard now known or later developed, which supports extended cell search procedures. The control circuit 120 controls the operation of the mobile terminal 100 based on instructions stored in memory (not shown). The control circuit 120 may be implemented with one or more processors, hardware, firmware, or a combination thereof. The control circuit 120 is configured to implement the procedure as shown in FIGS. 4 and 5. Persistent memory is used for storage of program instructions. Program instructions to implement the extended cell search procedure may be stored in some form of persistent memory (e.g., read-only memory). The control circuit may also include random access memory to store temporary data. The user interface 130 typically comprises a display and one or more input devices to enable the user to interact with and control the mobile terminal 100. The user input devices may include a keypad, touchpad, function keys, scroll wheels, or other similar input devices. If the mobile terminal includes a touchscreen display, the touchscreen display may also function as a user input device.

Figure 7:
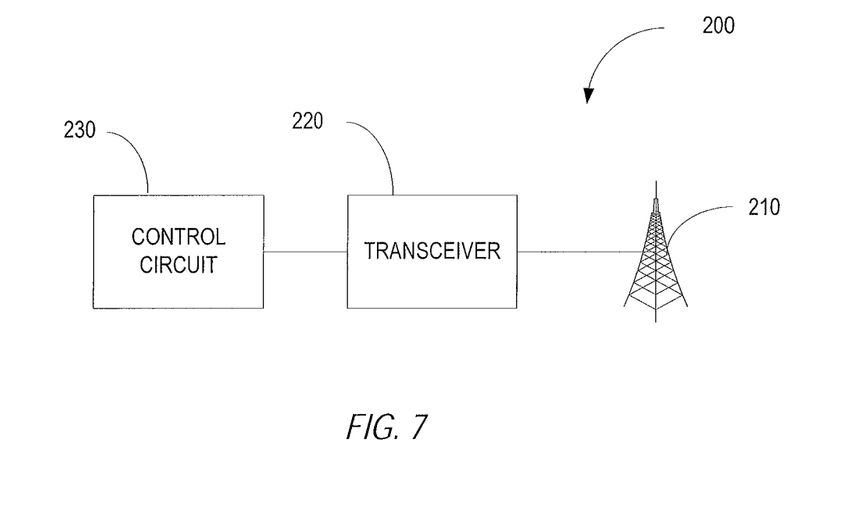
FIG. 7 illustrates an exemplary base station for a communication network supporting extended cell searches.

FIG. 7 illustrates an exemplary base station for communicating with the mobile terminal 100. The base station 200 comprises an antenna 210 coupled to a transceiver 220, and a control circuit 230. The transceiver 220 comprises a standard cellular transceiver operating according to the LTE standard, or other standard now known or later developed, supporting extended cell search procedures. The control circuit 230 controls the operation of the base station 200. The functions performed by the control circuit 230 include radio resource control and mobility management functions. The control circuit 230 may be implemented by one or more processors, hardware, firmware, or a combination thereof. The control circuit 230 is configured to implement the procedure as shown in FIG. 3. Program instructions to implement the extended cell search procedure may be stored in some form of persistent memory (e.g., read-only memory). The control circuit may also include random access memory to store temporary data.

The extended cell search procedure enables mobile terminals 100 to find cells for which the receive signal power is below the minimum level specified by the Release 8 LTE. Thus, measurement report sent by the mobile terminal 100 to the base station 200 will be more inclusive and, thus, create opportunities to improve uplink coverage and system capacity.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a base station, comprising:
    determining that a mobile terminal served by the base station has extended cell search capability, wherein the extended cell search capability enables detecting signals transmitted from one or more weaker cells that have signal to noise ratios below the reporting requirement of legacy mobile terminals;
    transmitting an extended cell search message to the mobile terminal to enable extended cell searching by the mobile terminal, wherein the extended search message indicates that one or more of said weaker cells are present in vicinity of the mobile terminal;
    transmitting a measurement map to the mobile terminal relating cell identities of candidate cells and corresponding subframes for performing measurements.

2. The method of claim 1 wherein the measurement map is transmitted in the extended cell search message.

3. The method of claim 1 wherein the measurement map is transmitted separately from the extended cell search message.

4. The method of claim 1 wherein transmitting an extended cell search message to the mobile terminal comprises transmitting the extended cell search message in one of a radio resource control signaling message and a layer 1 signaling message.

5. The method of claim 1 wherein the extended cell search message includes an indication that there are candidate cells that the mobile terminal could select as a serving cell.

6. A base station comprising:
    a transceiver for communicating with mobile terminals;
    a control circuit to control operation of the transceiver, said control circuit configured to:
        determine that a mobile terminal served by the base station has extended cell search capability, wherein the extended cell search capability enables detecting signals transmitted from one or more weaker cells that have signal to noise ratios below the reporting requirement of legacy mobile terminals;
        transmit an extended cell search message to the mobile terminal to enable extended cell searching by the mobile terminal, wherein the extended search message indicates that one or more of said weaker cells are present in vicinity of the mobile terminal;
        transmit a measurement map to the mobile terminal relating cell identities of candidate cells and corresponding subframes for performing measurements.

7. The base station of claim 6 wherein the control circuit is configured to transmit the measurement map in the extended cell search message.

8. The base station of claim 6 wherein the control circuit is configured to transmit the measurement map separately from the extended cell search message.

9. The base station of claim 6 wherein the control circuit is configured to transmit the extended cell search message in one of a radio resource control signaling message and layer 1 signaling message.

10. The base station of claim 7 wherein the control circuit is configured to include, in the extended cell search message, an indication that there are candidate cells that the mobile terminal could select as a serving cell.

11. A method of cell searching implemented by a mobile terminal, said method comprising:
    receiving an extended cell search message, wherein the extended search message indicates that one or more weaker cells are present in vicinity of the mobile terminal, wherein signals transmitted from said weaker cells have signal to noise ratios below the reporting requirement of legacy mobile terminals;
    receiving a measurement map relating cell identities of candidate cells and corresponding subframes for performing measurements; and performing an extended cell search responsive to the extended cell search message based on the received measurement map, wherein the extended cell search enables detecting signals transmitted from one or more of said weaker cells.

12. The method of claim 11 wherein receiving an extended cell search message comprises receiving the extended cell search message from a serving base station.

13. The method of claim 12 wherein receiving an extended cell search message to the mobile terminal comprises receiving the extended cell search message in one of a radio resource control signaling message and layer 1 signaling message.

14. The method of claim 12 wherein the measurement map is received in the extended cell search message.

15. The method of claim 12 wherein the measurement map is received separately from the extended cell search message.

16. The method of claim 11 wherein receiving an extended cell search message comprises receiving the extended cell search message on a broadcast channel.

17. The method of claim 11 wherein the extended cell search message includes an indication that there are candidate cells that the mobile terminal could select as a serving cell.

18. The method of claim 11 wherein performing an extended cell search comprises:
receiving synchronization signals from one or more candidate cells; and
averaging information contained in said synchronization signals over an extended period.

19. The method of claim 11 wherein performing an extended cell search comprises receiving synchronization signals from one or more candidate cells on an expanded set of receive antennas.

20. The method of claim 11 wherein performing an extended cell search comprises receiving and detecting an expanded set of synchronization signals from one or more candidate cells.

21. The method of claim 11 further comprising performing signal strength measurements for one or more of the candidate cells identified in the measurement map.

22. A mobile terminal comprising:
a transceiver for communicating with a base station;
a control circuit to control operation of the transceiver, said control circuit configured to:
receive an extended cell search message wherein the extended search message indicates that one or more weaker cells are present in vicinity of the mobile terminal, wherein signals transmitted from said weaker cells have signal to noise ratios below the reporting requirement of legacy mobile terminals;
receive a measurement map relating cell identities of candidate cells and corresponding subframes for performing measurements; and
perform an extended cell search responsive to the extended cell search message based on the received measurement map, wherein the extended cell search enables detecting signals transmitted from one or more of said weaker cells.

23. The mobile terminal of claim 22 wherein the control circuit is configured to receive the extended cell search message from a serving base station.

24. The mobile terminal of claim 23 wherein the control circuit is configured to receive the extended cell search message in one of a radio resource control signaling message and layer 1 signaling message.

25. The mobile terminal of claim 22 wherein the control circuit is configured to receive the measurement map in the extended cell search message.

26. The mobile terminal of claim 22 wherein the control circuit is configured to receive the measurement map separately from the extended cell search message.

27. The mobile terminal of claim 22 wherein the control circuit is configured to receive the extended cell search message on a broadcast channel.

28. The mobile terminal of claim 22 wherein the extended cell search message includes an indication that there are candidate cells that the mobile terminal could select as a serving cell.

29. The mobile terminal of claim 22 wherein the control circuit is configured to perform an extended cell search by:
receiving synchronization signals from one or more candidate cells; and
averaging said synchronization signals over an extended period.

30. The mobile terminal of claim 22 wherein the control circuit is configured to perform an extended cell search by receiving synchronization signals from one or more candidate cells on an expanded set of receive antennas.

31. The mobile terminal of claim 22 wherein the control circuit is configured to perform an extended cell search by receiving an expanded set of synchronization signals from one or more candidate cells.

32. The mobile terminal of claim 22 wherein the control circuit is further configured to perform signal strength measurements for one or more of the candidate cells identified in the measurement map.

33. The method of claim 1 wherein the legacy mobile terminals comprise mobile terminals for Third Generation Partnership Project standard Long Term Evolution Release 8.

34. The base station of claim 6 wherein the legacy mobile terminals comprise mobile terminals for Third Generation Partnership Project standard Long Term Evolution Release 8.

35. The method of claim 11 wherein the legacy mobile terminals comprise mobile terminals for Third Generation Partnership Project standard Long Term Evolution Release 8.

36. The mobile terminal of claim 22 wherein the legacy mobile terminals comprise mobile terminals for Third Generation Partnership Project standard Long Term Evolution Release 8.

* * * * *

UNITED STATES PATENT AND TRADEMARK OFFICE
CERTIFICATE OF CORRECTION

PATENT NO. : 8,892,094 B2  Page 1 of 1
APPLICATION NO. : 12/899780
DATED : November 18, 2014
INVENTOR(S) : Lindoff et al.

It is certified that error appears in the above-identified patent and that said Letters Patent is hereby corrected as shown below:

In the Specification

In Column 4, Line 5, delete "terminal 10Q" and insert -- terminal 100 --, therefor.

Signed and Sealed this
Fourteenth Day of July, 2015

Michelle K. Lee
*Director of the United States Patent and Trademark Office*